United States Patent [19]

Buchwald et al.

[11] Patent Number: 4,995,908

[45] Date of Patent: Feb. 26, 1991

[54] DICHLOROTRIFLUOROETHANE-CONTAINING MIXTURES

[75] Inventors: Hans Buchwald, Ronnenberg; Boleslaus Raschkowski, Wiedensahl, both of Fed. Rep. of Germany

[73] Assignee: Kali-Chemie AG, Hanover, Fed. Rep. of Germany

[21] Appl. No.: 241,469

[22] Filed: Sep. 8, 1988

[30] Foreign Application Priority Data

Sep. 17, 1987 [DE] Fed. Rep. of Germany ....... 3731223

[51] Int. Cl.$^5$ ................................................ B28B 7/36
[52] U.S. Cl. .................................. 106/38.22; 106/311; 252/171
[58] Field of Search ............................ 106/38.22, 311; 252/171

[56] References Cited

U.S. PATENT DOCUMENTS

| | | | |
|---|---|---|---|
| 3,253,932 | 5/1966 | White et al. | 106/38.22 |
| 3,332,881 | 7/1967 | Burt et al. | 252/162 |
| 4,191,578 | 3/1980 | Carter | 106/38.22 |
| 4,624,899 | 11/1986 | Macaigne | 106/38.22 |

OTHER PUBLICATIONS

Chem. Abstract 65:927c, du Pont, Feb. 66.

*Primary Examiner*—Mark L. Bell
*Assistant Examiner*—Deborah Jones
*Attorney, Agent, or Firm*—Foley & Lardner, Schwartz, Jeffery, Schwaab, Mack, Blumenthal & Evans

[57] ABSTRACT

Liquid compositions having properties of activity as release agents are described, which contain dichlorotrifluoroethane as a solvent and at least one agent with release effective properties, as well as the use of these compositions and a process for the preparation thereof.

17 Claims, No Drawings

DICHLOROTRIFLUOROETHANE-CONTAINING MIXTURES

BACKGROUND OF THE INVENTION

The present invention relates to liquid compositions which contain dichlorotriflouroethane as a solvent and at least one agent with release effective properties, to the use of these compositions, and to a process for the preparation of such compositions.

In many industrial fields of use which involve working steps such as casting, forming, pressing and the like—for example in the production and processing of plastics, foam materials, building materials, rubber articles, tires, metals, glasses, ceramic products and the like- release agents, lubricants or parting agents are nowadays required. As used herein, the term "release agents" refers to solid or liquid films which reduce the adhesive forces between two adjoining surfaces, i.e. prevent them from sticking together. The term "lubricants" refers to additives for plastic compositions, for example compression-molding compositions and injection-molding compositions. They are required for improving the sliding of fillers and hence rendering the compression-molding compositions more easily deformable. The release agents, lubricants or parting agents contain release effective components, for example in the form of dry powders, dry films, wet films, pastes, burnt-in films, solutions or dispersions. A special form is represented by the so-called internal release effective components, which are admixed with the material which is to be released and are capable of either becoming enriched at the surface or causing a more rapid curing of the surface, so that no attachment is formed between the mold wall and the molding.

In many instances of the above working steps, the residues of the agent with release effective properties must be removed from the mold from time to time by means of solvents. For cleaning the molds usually solvents such as hydrocarbons and chlorinated hydrocarbons are used, of which the former are inflammable and the latter cause skin irritation.

U.S. Pat. No. 4,028,120 discloses a mold-release agent for the production of molded rubber products and the molding of polyurethane foams. The mold-release composition used in this case contains paraffin wax, lamp oil and sodium soaps of tall oil acids in a paraffinic base oil. The mold-release agent used must be soluble or emulsifiable in water, so that the mold-release agent can be separated from the molded product by spraying or washing with warm water.

U.S. Pat. No. 4,659,493 and West German Offenlegungsschrift DE-OS 33 35 870 describe the preparation of special wax derivatives which can be used, for example release agent components but especially as cooling lubricants, whereby the fluorochlorohydrocarbons trichloromonofluoromethane, 1,1,2-trichloro-1,2,2-trifluoroethane, 1,1,2,2-tetrachlorodifluoroethane, tetrachloromonofluoroethane and/or trichlorodifluoroethane are mentioned as suitable solvents.

SUMMARY OF THE INVENTION

The object of the invention is to provide new improved liquid compositions of agents with release effective properties which allow economical use and which are energy-saving and can be used without frequent cleaning of the molds used.

These and other objects of the invention are achieved by providing a liquid composition comprising dichlorotrifluoroethane as a solvent and from 0.1 to 80% by weight relative to the total mixture of at least one release effective agent.

DETAILED DESCRIPTION OF PREFERRED EMBODIMENTS

The present invention provides liquid compositions having improved properties and containing a solvent and at least one agent with release effective properties, the solvent present being dichlorotrifluoroethane and the release effective agent being present in a quantity of 0.1 to 80% by weight, preferably 0.1 to 30% by weight, relative to the total mixture.

As the dichlorotrifluoroethane within the meaning of the invention, the isomers 1,1-dichloro-2,2,2-trifluoroethane (R123), 1,2-dichloro-1,2,2-trifluoroethane (R123a) or 2,2-dichloro-1,1,2-trifluoroethane (R123b) can be present individually or in any desired mixtures with one another. However, 1,1-dichloro-b 2,2,2-trifluoroethane (R123) is preferably used. ethane isomers or their mixtures with other fluorochlorohydrocarbons of the methane, ethane or propane series, such as, for example, trichloromonofluoromethane, trichlorotrifluoroethane, tetrachlorodifluoroethane, tetrachloromonofluoroethane, trichlorodifluoroethane, monochlorohexafluoropropane or mixtures thereof, can be used in compositions according to the invention. The dichlorotrifluoroethane ethane isomers can also be present in the compositions according to the invention in the form of an azeotrope with other solvents - for example with fluorochlorohydrocarbons, fluorohydrocarbons, chlorohydrocarbons, hydrocarbons, alcohols, ethers and the like.

The compositions according to the invention are characterized in that the release effective agent is selected from the group consisting of waxes, wax derivatives, silicones, metal soaps, fats, oils, polymers, fluorocarbons and inorganic powders. Preferably waxes, wax derivatives, metal soaps or silicones are used.

As waxes within the meaning of the invention, natural waxes of animal or vegetable origin, preferably natural waxes having a softening point of at least 40° C., are used in one embodiment.

In another embodiment of the invention, the waxes are unsaturated long-chain esters of carboxylic acids with monoalcohols having 34 to 50 carbons atoms in total. In this case, fatty acid esters which have an iodine number of less than 95, preferably 30 to 95 and especially 75 to 95, are preferred. Mixtures of such fatty acid esters are commercially available and are described, for example, in the Handbook of Chemistry and Physics, 55th edition, page C-753.

A further embodiment is characterized in that the wax derivatives are derivatives which are obtained by sulfochlorination, sulfidation or hydrogen fluoride treatment of unsaturated long-chain esters of carboxylic acids with monoalcohols having 34 to 50 carbon atoms in total. The derivatives obtained by hydrogen fluoride treatment are fluorine-containing waxy masses, which are known, for example, from U.S. Pat. No. 4,659,493 and the fluorine content of which can be varied within a wide range. The fluorine content of these adducts of hydrogen fluoride with these unsaturated long-chain esters may lie, for example, in the range from 0.1 to 4.3% by weight. A completely different type of derivatives of long-chain unsaturated esters, which are obtainable by hydrogen fluoride treatment, are oily products (hereinafter referred to as sesquimers) which, as compared with the starting wax, have 1.1 to 1.9 times the molecular mass and contain less than 1% by weight of unconverted wax. These wax derivatives have only very low contents of bound fluorine, if any. As a rule, the fluorine content is less than 0.1% by weight and the iodine number is in the range from 5 to 20.

It is also possible to use other wax derivatives, for example derivatives which have been obtained by hydrogenation of unsaturated long-chain esters of carboxylic acids with monoalcohols having 34 to 50 carbon atoms in total and are then partially saturated or fully saturated. In this context partially saturated derivatives are understood to be those the iodine number of which is below that of the educt employed in the hydrogenation.

Further waxes, which may be used within the scope of the present invention include synthetic waxes, preferably paraffin waxes or polyethylene waxes. In one embodiment, for example, an oxidized polyethylene wax having an average molecular weight of 3,700 to 4,500 (by viscometry) and an acid number from 20 to 30 and a melting point of 89° to 99° C. is used.

Another type of the composition according to the invention contains silicones. The silicones used can be in the form of oils, fats or resins. The silicone oils can be used as such or in the form of silicone oil emulsions or silicone pastes, which contain a consistency modifier, for example highly dispersed silicic acid incorporated into the silicone oil. Silicone fats usually include metal soaps as consistency modifying components. The silicone products used within the scope of present invention are commercially available products.

A further embodiment of compositions within the meaning of the invention contains inorganic powders, preferably graphite, talc or mica.

Other conventional agents with release effective properties, such as oils, for example mineral oils and ester oils, can also be used in compositions according to the invention. Further suitable agents active as release agents include polymers, for example polymeric alcohols (polyethylene glycol), polyamides or polyolefins.

In a further embodiment of the invention, conventional solubilizers for the release effective agent are added to the compositions. Suitable solubilizers are known, toxicologically acceptable solvents having solubilizing properties. The solubilizers may be present in the compositions in quantities of 1 to 80% by weight, preferably 10 to 30% by weight, relative to the total composition. One embodiment of the invention is distinguished in that aliphatic hydrocarbons, preferably petroleum fractions, having a boiling range of, for example, 100° to 140° C., are used as solubilizers. Other solubilizers known per se can also be used.

In further embodiments of the compositions according to the invention, up to 1% by weight of known corrosion inhibitors may additionally be included. Such corrosion inhibitors for metals such as, for example, magnesium, aluminum, titanium, brass, bronze and steel, are commercially available. They are based in most cases on compositions which contain organic compounds with heteroatoms such as sulfur or especially nitrogen. Examples which have proved suitable are individual compounds or mixtures from the classes of the benzothiazoles, for example mercaptobenzothiazole, benzimidazoles, for example 2-phenylbenzimidazole, triazoles, for example benzotriazoles and tolyltriazoles, oxazolines, for example alkyl-and/or hydroxyalkyl-substituted oxazolines, amides and amines, for example tertiary amines. Optionally, conventional stabilizers can also be added to the compositions according to the invention, especially for stabilizing the dichlorotrifluoroethane. Furthermore, consistency regulating additives may be included.

The compositions according to the invention may be in the form of either solutions or dispersions. The term dispersions is understood to include both emulsions and suspensions.

The invention also comprises the use of the compositions as release agents, lubricants or parting agents, for example in the manufacture of plastics or foams or in other fields of application.

Moreover, the invention comprises the process for preparing the compositions according to the invention, wherein one or more agents with release effective properties are incorporated in a quantity of 0.1 to 80% by weight, preferably 0.1 to 30% by weight, relative to the total composition, into the solvent dichlorotrifluoroethane, Optionally, conventional solubilizers or other additives such as stabilizers and corrosion inhibitors are added at the same time.

The compositions according to the invention with dichlorotrifluoroethane as the solvent have improved adhesion-reducing properties, high chemical inertness and good spreading capacity. Compared to conventional release agents, in which hydrocarbons are used as the solvent, the compositions according to the invention have a higher flash point. Due to the good solvent power of the dichlorotrifluorethane, the preparation of the compositions according to the invention is particularly simple, in contrast to the preparation of release agents with the use of, for example, hydrocarbons as the solvent. A further advantage of the compositions according to the invention is that their use can save energy as compared with conventional compositions. Thus, for example, in the preparation of foams, the solvent must first be vaporized after the mold has been coated with the release agent. When the mixtures according to the invention are used, the mold needs to be heated to a far lesser extent in order to vaporize the solvent than is the case with conventional compositions of the prior art. This can lead to energy savings of up to 10%. Moreover, the use of the compositions according to the invention in place of conventional release agent compositions is more economical, since less release agent composition is consumed in the same application. Additional advantages manifest themselves, for example in prolonged use of the molds, in the fact that the molds used have to be cleaned less frequently between the working steps.

The following examples are intended to illustrate the invention in further detail without, however, restricting it in its scope.

EXAMPLE 1

A composition according to the invention was prepared from 5% by weight of HF-wax-adduct (described in U.S. Pat. No. 4,659,493) and 95% by weight of dichlorotrifluoroethane. The HF-wax-adduct is a wax derivative which is obtained by hydrogen fluoride treatment of unsaturated long-chain esters of carboxylic acids with monoalcohols having 34 to 50 carbon atoms in total, this derivative containing hydrogen fluoride added to the double bonds of the educt. The HF-waxadduct was prepared in accordance with Example 1 of U.S. Pat. No. 4,659,493.

The composition is a clear solution and shows excellent properties as a release agent.

EXAMPLES 2 to 12

Analogously to Example 1, the further Examples 2 to 12, listed in the following Table, of compositions according to the invention were prepared, which likewise have excellent properties as release agents. The compositions are given in % by weight.

| Composition constituents | EXAMPLE | | | | | | | | | | |
|---|---|---|---|---|---|---|---|---|---|---|---|
| | 2 | 3 | 4 | 5 | 6 | 7 | 8 | 9 | 10 | 11 | 12 |
| Dichlorotrifluoroethane | 95 | 90 | 81 | 50 | 90 | 20 | 80 | 80 | 20 | 80 | 20 |
| HF treated wax Sesquimer* | 5 | | | | | | | | | | |
| Wax ester (Iodine number 85) | | 10 | | | | | | | | | |
| Silicone oil (20,000 mm²/sec) | | | 3 | 30 | 10 | | | | | | |
| Paraffin (Melting point 56–58° C.) | | | | | | 5 | 5 | | | | |
| Oxidized polyethylene wax (Melting point 89–99° C.) | | | | | | | | 5 | 5 | 4 | |
| Polyethylene wax (Melting point 98–108° C.) | | | | | | | | | | | 5 |
| Magnesium stearate | | | | | | | | | | 1 | |
| Petroleum fraction (100–140° C.) | | | 16 | 20 | | 75 | 15 | 15 | 75 | 15 | 75 |
| Type of composition** | S | S | S | S | S | S | D | D | D | D | D |

*Known from U.S. Pat. No. 4,659,493 and prepared analogously to Examples 2 or 3 given therein
**S = clear solution; D = Dispersion The foregoing description and examples have been set forth merely to illustrate the invention and are not intended to be limiting. Since modifications of the described embodiments incorporating the spirit and substance of the invention may occur to persons skilled in the art, the scope of the invention should be limited solely with reference to the appended claims and equivalents.

What is claimed is:

1. A liquid composition consisting essential a single halogenated hydrocarbon solvent consisting of dichlorotrifluoroethane and from 0.1 to 80% by weight relative to the total mixture of at least one release effective agent selected from the group consisting of waxes, wax derivatives, metal soaps and silicones.

2. A composition according to claim 1, comprising from 0.1 to 30% by weight relative to t he total mixture of said at least one release effective agent.

3. A composition according to claim 1, wherein said release effective agent is a natural wax of animal or vegetable origin.

4. A composition according to claim 3, wherein said natural wax has a softening point of at least 40° C.

5. A composition according to claim 1, wherein said waxes are unsaturated long-chain esters of carboxylic acids with monoalcohols, having 34 to 50 carbon atoms in total.

6. A composition according to claim 1, wherein said wax derivatives are obtained by subjecting a wax to a treatment selected from the group consisting of sulfochlorination, sulfidation or hydrogen fluoride treatment of unsaturated long-chain esters of ca boxylic acids with monoalcohols having 34 to 50 carbon atoms in total.

7. A composition according to claim 1, wherein said waxes are synthetic waxes.

8. A composition according to claim 7, wherein said synthetic waxes are selected from the group consisting of paraffin waxes and polyethylene waxes.

9. A composition according to claim 1, wherein said silicones are in the form of oils, fats, resins or pastes.

10. A composition according to claim 1, wherein said metal soaps are fatty acid salts of metals selected from the group consisting of magnesium, calcium, zinc, aluminum and lead.

11. A composition according to claim 10, wherein said salts are stearic acid salts.

12. A composition according to claim 1, further comprising an aliphatic hydrocarbon solubilizer in an amount of from 1 to 80% by weight relative to the total mixture.

13. A composition according to claim 12, comprising from 10 to 30% by weight solubilizer relative to the total mixture.

14. A composition according to claim 11, wherein said aliphatic hydrocarbon is a petroleum fraction having a boiling range of from 100 to 140° C.

15. A method of preparing a release effective liquid composition comprising the step of incorporating into a liquid comprising a single halogenated hydrocarbon solvent consisting of dichlorotrifluoroethane, an effective release promoting amount in the range of from 0.1 to 80% by weight relative to the total composition of at least one release effective agent selected from the group consisting of waxes, wax derivatives, metal soaps and silicones.

16. A method according to claim 15, wherein said release effective agent is incorporated into said dichlorotrifluoroethane in a amount in the range from 0.1 to 30% by weight relative to the total composition.

17. A method according to claim 15, further comprising incorporating a solubilizer into said composition.

* * * * *